(12) United States Patent
Brown

(10) Patent No.: US 10,925,255 B1
(45) Date of Patent: Feb. 23, 2021

(54) ADJUSTABLE RECEPTACLE FOR PET FOODS AND BEVERAGES

(71) Applicant: Joel Brown, North Hollywood, CA (US)

(72) Inventor: Joel Brown, North Hollywood, CA (US)

(*) Notice: Subject to any disclaimer, the term of this patent is extended or adjusted under 35 U.S.C. 154(b) by 280 days.

(21) Appl. No.: 15/596,403

(22) Filed: May 16, 2017

(51) Int. Cl.
*A01K 5/01* (2006.01)
*A01K 7/00* (2006.01)
*B65D 25/24* (2006.01)
*F16M 11/38* (2006.01)

(52) U.S. Cl.
CPC ............ *A01K 5/0114* (2013.01); *A01K 7/00* (2013.01); *B65D 25/24* (2013.01); *F16M 11/38* (2013.01); *F16M 2200/024* (2013.01); *F16M 2200/068* (2013.01)

(58) Field of Classification Search
CPC ...... A01K 5/0114; B65D 61/02; B65D 61/00; F16M 11/38; A47K 5/03; A24F 19/0092
See application file for complete search history.

(56) References Cited

U.S. PATENT DOCUMENTS

| | | | | |
|---|---|---|---|---|
| 235,174 A * | 12/1880 | Scantlin | ................. | B65D 61/00 248/135 |
| 335,069 A * | 1/1886 | Graves | ................... | B65D 61/00 248/135 |
| 578,374 A * | 3/1897 | Trull | ........................ | A47K 1/05 4/644 |
| 927,722 A * | 7/1909 | Frambach | ............. | F21V 21/116 248/229.17 |
| 2,147,861 A * | 2/1939 | Shopen | ..................... | A47K 5/02 220/751 |
| 2,375,565 A * | 5/1945 | Liakopulos | ......... | A24F 19/0092 220/628 |
| 2,434,360 A * | 1/1948 | Hess | .................... | A24F 19/0092 248/224.8 |
| 2,681,200 A * | 6/1954 | Bisson | ................ | A24F 19/0092 131/231 |
| 2,723,037 A * | 11/1955 | Matesic | .................. | A47B 13/16 108/44 |
| 2,723,487 A * | 11/1955 | Mardre, Jr. | ............... | A47K 5/03 248/206.1 |
| 2,950,836 A * | 8/1960 | Murdock | ............ | A24F 19/0092 131/241 |
| 4,133,443 A * | 1/1979 | Medina | .................... | A47K 5/02 206/77.1 |
| D258,007 S * | 1/1981 | Schmidt | ....................... | D24/177 |
| 5,117,779 A * | 6/1992 | Karow | ................. | A01K 45/002 119/69.5 |

(Continued)

*Primary Examiner* — Magdalena Topolski
(74) *Attorney, Agent, or Firm* — Patrick Bright

(57) ABSTRACT

An adjustable receptacle for pet foods and beverages includes a base for supporting the receptacle on a horizontally disposed surface; on the base, a connector for attaching a releasably adjustable, positionable arm member to the base, and for releasably securing the arm member in a plurality of desired positions with respect to the base; a releasably adjustable, positionable arm member attached to the connector at the arm member's proximal end; and, attached to the distal end of the arm member, a releasably adjustable, positionable receptacle, configured to hold pet foods and beverages, in a plurality of desired positions at the distal end of the arm member.

2 Claims, 4 Drawing Sheets

(56) References Cited

U.S. PATENT DOCUMENTS

| | | | | |
|---|---|---|---|---|
| 5,119,765 | A * | 6/1992 | Roush, Jr. | A01K 5/0275 119/57.91 |
| 5,761,844 | A * | 6/1998 | Horschel | A01K 97/10 248/131 |
| 6,167,840 | B1 * | 1/2001 | White | A01K 5/0142 119/61.53 |
| 6,959,665 | B2 * | 11/2005 | Flowers | A01K 7/00 119/69.5 |
| 7,380,759 | B1 * | 6/2008 | Whiteside | B60R 11/02 248/183.1 |
| 7,424,949 | B2 * | 9/2008 | Kumar | A47K 5/03 206/77.1 |
| 8,539,910 | B1 * | 9/2013 | Hensley | A01K 39/0206 119/72 |
| 9,226,478 | B1 * | 1/2016 | Uhl | A01K 5/0114 |
| 9,658,517 | B2 * | 5/2017 | McElderry | G03B 17/566 |
| D813,469 | S * | 3/2018 | Conley | D30/133 |
| 9,930,865 | B1 * | 4/2018 | Hunt | A01K 5/0114 |
| 10,065,695 | B1 * | 9/2018 | Melcher | B62H 3/04 |
| 2003/0172879 | A1 * | 9/2003 | Bader | A01K 5/0114 119/709 |
| 2006/0037159 | A1 * | 2/2006 | Wang | A47L 13/12 15/144.1 |
| 2007/0262224 | A1 * | 11/2007 | Cheng | F16M 11/105 248/423 |
| 2013/0247829 | A1 * | 9/2013 | Taneja | A01K 5/0291 119/51.11 |
| 2015/0239616 | A1 * | 8/2015 | Henry | A47G 19/06 220/751 |
| 2016/0000043 | A1 * | 1/2016 | Parness | A01K 15/025 119/51.01 |
| 2016/0037748 | A1 * | 2/2016 | Taneja | A01K 5/0291 119/51.11 |
| 2016/0302482 | A1 * | 10/2016 | O'Loughlin | A24F 19/0092 |
| 2018/0070557 | A1 * | 3/2018 | Uhl | A01K 5/0114 |

* cited by examiner

ADJUSTABLE RECEPTACLE FOR PET FOODS AND BEVERAGES

FIELD OF THE INVENTION

This invention relates to an adjustable receptacle for pet foods and beverages that includes a base connected to a releasably adjustable, positionable arm member at the proximal end of the arm member, and connected, at the distal end of the arm member, to a releasably adjustable, positionable receptacle for pet foods and beverages.

SUMMARY OF THE INVENTION

An adjustable receptacle for pet foods and beverages includes a base for supporting the receptacle on a horizontally disposed surface; on the base, a connector for attaching a releasably adjustable, positionable arm member to the base, and for releasably securing the arm member in a plurality of desired positions with respect to the base; a releasably adjustable, positionable arm member attached to the connector at the arm member's proximal end; and, attached to the distal end of the arm member, a releasably adjustable, positionable receptacle, configured to hold pet foods and beverages, in a plurality of desired positions at the distal end of the arm member.

In some embodiments, the base may have a circular periphery, and include a substantially flat upper surface, a skirt at the periphery of, and substantially surrounding, and depending from, the upper surface of the base. Attached to, and projecting from, the upper surface, may be a connector for the arm member. In some embodiments, the connector may include a plate atop a pedestal. This plate may have a rounded profile at the top, and a transverse hole near the center of the plate. The pedestal may include, between the plate and the bottom of the pedestal, a portion wider than the plate, forming a shelf at the bottom of the plate. In some embodiments, the base may be configured for positioning on a substantially horizontal surface. Alternatively, the base may be configured for positioning on a non-horizontal, or even on a vertical surface surface. If so configured, the base may include attachment mechanisms such as screw receiving holes, or an adhesive below the upper surface, for example.

In some embodiments, the arm member may include two four-sided arm parts that are substantially alike in shape and size, and that may be substantially flat along two opposite sides, rounded at one or both ends of these parts, and substantially flat along the edge surface joining the sides. In some embodiments, the two arm parts may include opposing, co-linear, through holes near the proximal ends of these arm parts.

In some embodiments, around these through holes, on the inner surfaces of the arm parts, may be attached two concentric, circular, fixed, edge toothed projections for engaging complementary grooves at the sides of the connector plate. Moving the arm member from a first position to another, desired position requires disengaging the edge toothed projections from the complementary grooves, changing/adjusting the position of the arm member with respect to the base's upper surface, and re-engaging the edge toothed projections in the complementary grooves at the sides of the connector plate.

In some embodiments, a single bolt may be placed through the opposing, co-linear holes in the arm members, and in the plate, and held in place with a nut at the other end of the bolt. The head of the bolt, and the nut attached to this bolt, may seat in indents of appropriate size/shape on the outer walls of the two arm members.

In some embodiments, the receptacle may be adjustably positionable near the distal ends of the arm member. In such embodiments, the receptacle for pet foods and beverages may be bowl shaped, round, square, or rectangular in profile, and of any desired length/width/depth.

In some embodiments, at the bottom of, and attached to, this receptacle, may be a substantially flat sided projection that includes a through hole, and, surrounding this through hole, on both sides, complementary grooves for engagement with/disengagement from, the inner surfaces of the two arm parts.

In such embodiments, the arm members may include opposing, co-linear, through holes near the proximal ends of these arm parts. Around these through holes, on the inner surfaces of the arm parts, may be attached a concentric, circular, fixed, edge toothed projection for engaging complementary grooves at the sides of the flat sided projection.

Moving the receptacle arm member from a first position to another, desired position, requires disengaging the edge toothed projection from the complementary grooves, changing/adjusting the position of the arm member with respect to the receptacle's projection, and re-engaging the edge toothed projection in the complementary grooves at the sides of the connector plate.

In some embodiments, a single bolt may be placed through the opposing, co-linear holes in the arm members, and in the projection from the receptacle, and held in place with a nut at the other end of the bolt. The head of the bolt, and the nut attached to this bolt, may seat in indents/recesses of appropriate size/shape on the outer walls of the two arm members.

In some embodiments, the arm member's position may be adjustable, with the receptacle's position fixed. In other embodiments, the arm member's position may be fixed, with the receptacle's position adjustable.

BRIEF DESCRIPTION OF THE DRAWINGS

An exemplary embodiment of the invention is described in the following detailed description of the drawings, in which.

DETAILED DESCRIPTION OF THE DRAWINGS

Figure 1:
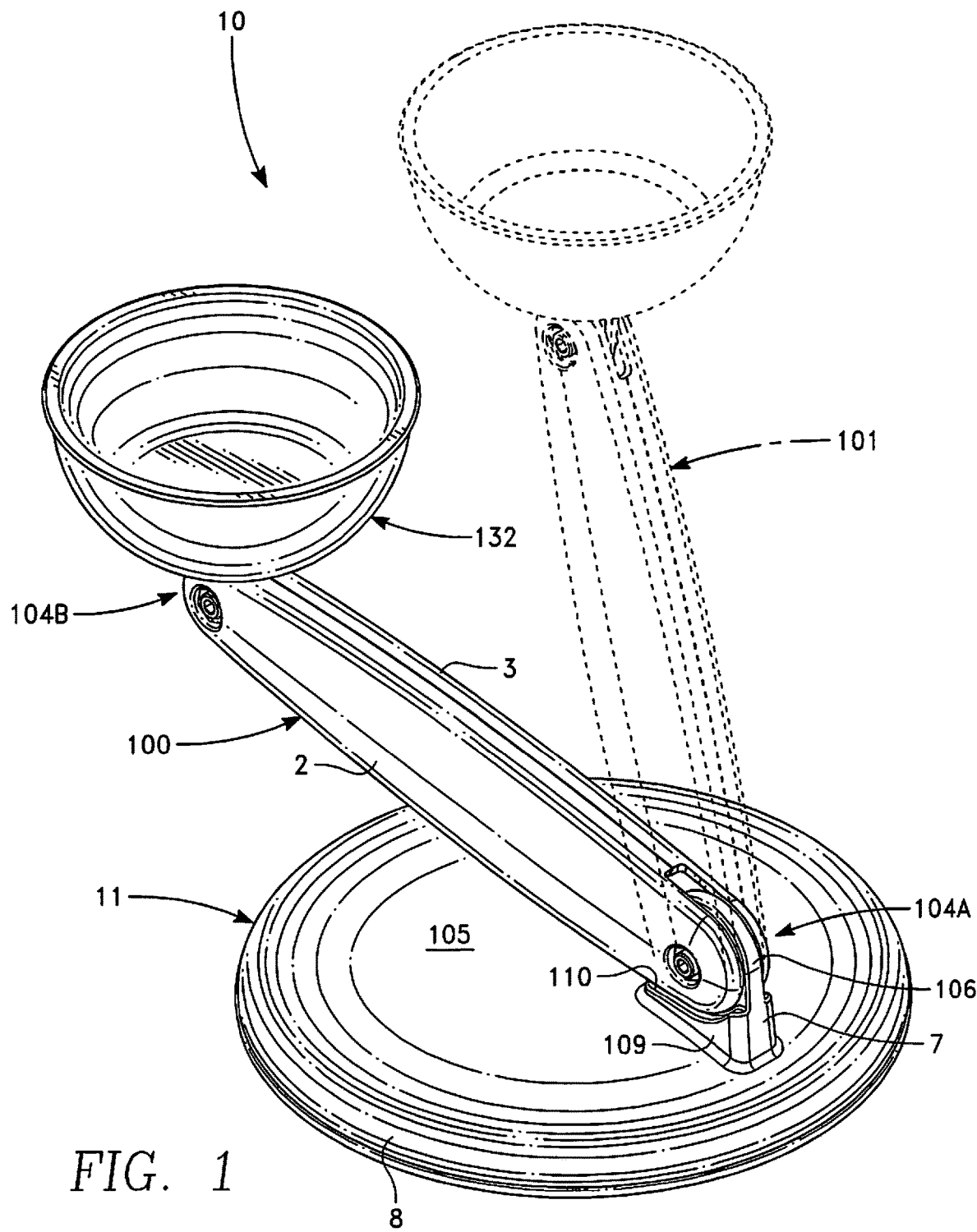
FIG. 1 is a perspective view of an exemplary embodiment of an adjustable receptacle for pet foods and beverages.

The drawings show an exemplary, non-limiting embodiment 10 of an adjustable receptacle for pet foods and beverages. Embodiment 10 includes base 11 with a circular periphery, substantially flat upper surface 105, and a circumferential, downwardly-disposed skirt 8 at the periphery of surface 105. Skirt 8 substantially surrounds upper surface 105.

Base 11 is configured for placement/positioning on a substantially flat, horizontally disposed surface. Atop, and attached to, base 11, is connector 7 for attaching a releasably adjustable, positionable two-part arm member 2/3 to base 11 at the proximal end 104A of arm member 2/3, and for releasably securing arm member 2/3, and receptacle 132, in a plurality of desired positions with respect to base 11. Two such positions, 100 and 101, shown in solid and dotted lines, respectively, exemplify two such positions.

Arm member 2/3 is releasably, movably, adjustably positionable, at its proximal end, through connector 7, with respect to the plane of base 11. Attached to the distal end 10 of arm member 2/3 is releasably adjustable, positionable receptacle 132, configured to hold pet foods and beverages, in a plurality of desired positions at the distal end 104B of arm member 2/3.

Attached to, and projecting from, upper surface 105 is connector 7 for arm member 2/3. Connector 7 includes plate 106 atop pedestal 109. Plate 106 has a rounded profile at the top, and a transverse hole 108 (see FIG. 2) near the center of plate 106. Pedestal 109 includes, between plate 106 and the top of pedestal 109, a shelf portion 110 that is wider than plate 106.

Base 11 is configured for positioning on a substantially horizontal surface. Alternatively, base 11 may be configured for positioning on a non-horizontal, or even on a vertical surface. If so configured, the base may include attachment mechanisms such as screw receiving holes, or an adhesive below base 11's upper surface, for example.

Figure 2:
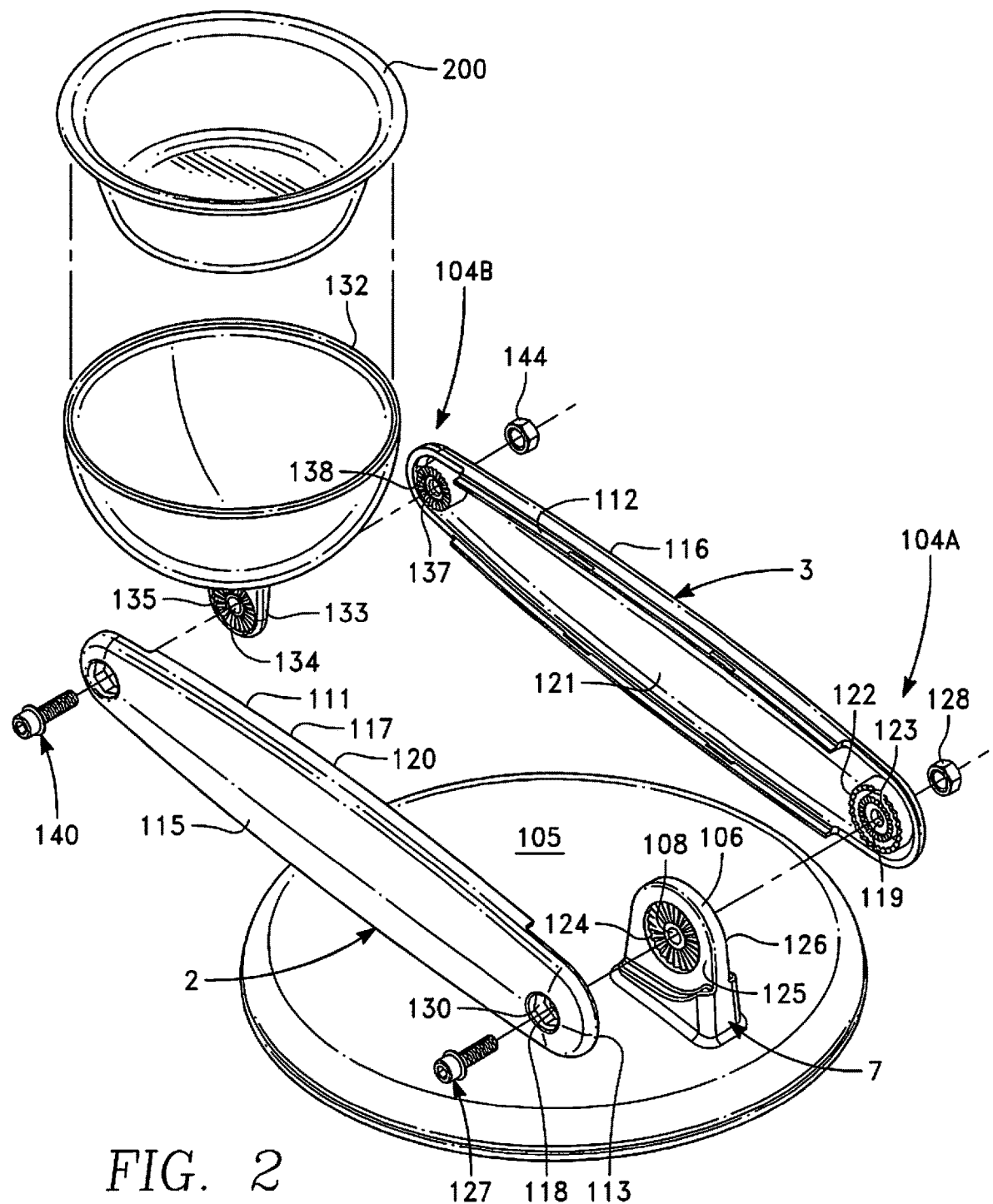
FIG. 2 is an exploded perspective view of the adjustable receptacle of FIG. 1.
Figure 3A:
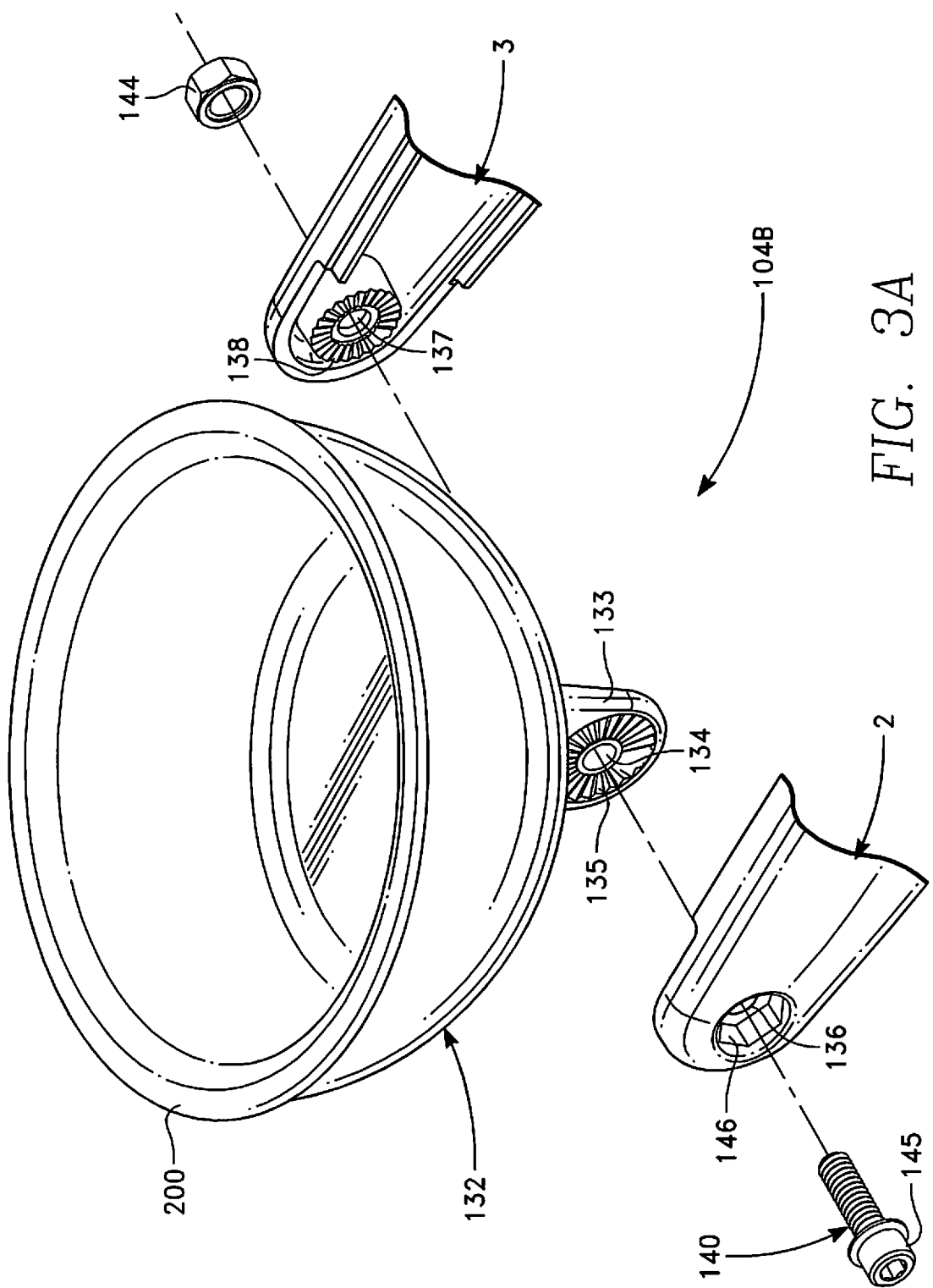
FIG. 3A is an exploded perspective view of the distal ends of the arm members shown in FIGS. 1 and 2.
Figure 3B:
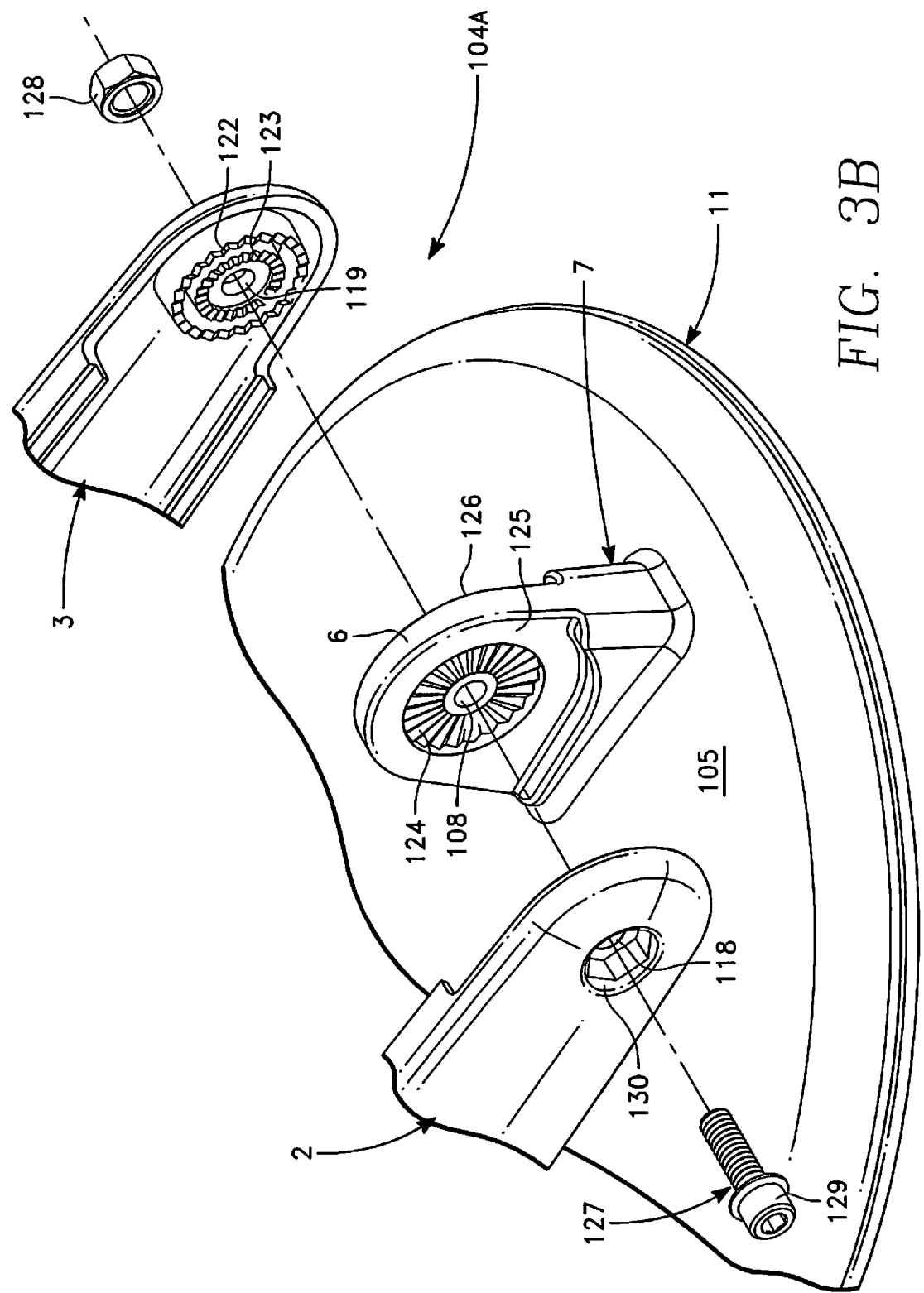
FIG. 3B is an exploded perspective view of the proximal ends of the arm members shown in FIGS. 1 and 2

See FIG. 2. Arm member 2/3 includes two four-sided arm parts 115 and 116 that are substantially alike in shape and size. Arm members 2 and 3 are substantially flat along two opposite sides 111 and 112, rounded at one or both ends 113 and 114, and substantially flat along the edge surface 117 joining sides 111 and 112. Arm members 2 and 3 include opposing, co-linear, through holes 118 and 119 near the proximal ends 104A of these arm members 2/3.

Around through holes 118 and 119, on the inner surfaces 120 and 121 of arm parts 2/3 are two concentric, circular, fixed, edge toothed projections 122 and 123 for engaging complementary grooves 124 on the two opposing sides 125 and 126 of connector plate 106.

Moving arm member 2/3 from a first position, such as position 100 to another position, such as position 101 (see FIG. 1) requires disengaging the edge toothed projections 122 and 123 from the complementary grooves 124, changing/adjusting the position of arm member 2/3 with respect to the base's upper surface 105, and re-engaging the edge toothed projections 122 and 123 in the complementary grooves 124 at the sides 125/126 of connector plate 106.

A bolt 127 is placed through opposing, co-linear holes 118/119 in arm members 2/3, and in plate 106, and held in place with nut 128, at the other end of bolt 127. Head 129 of bolt 127, and nut 128, attached to this bolt, may seat in indents 130/131 of appropriate size/shape on the outer walls of arm members 2/3.

Receptacle 132 may be adjustably positionable near distal ends 133/134 of arm members 2/3. Receptacle for pet foods and beverages may be bowl shaped, round, square, or rectangular in profile, and of any desired length/width/depth. Receptacle 132 receives removable bowl 200. Bowl 220 can hold pet foods and beverages, and can be removed for cleaning or replacement as desired.

At the bottom of, and attached to, receptacle 132, is a substantially flat two sided projection 133 that includes a through hole 134. Surrounding through hole 134, on both sides of projection 133, is complementary, concentric, edge-toothed projection 135 for engagement with/disengagement from, concentric, edge toothed projection 138 on the inner surfaces 120/121 at the distal ends of arm parts 2/3.

Arm parts 2/3 include, at their distal ends, opposing, co-linear, through holes 136/137 near these distal ends of arm parts 2/3. Around these through holes 136/137, and attached to, the inner surfaces of these arm parts, are two concentric, circular, fixed, edge toothed projections 138/139 for engaging complementary grooves 135 at the sides of projection 133.

Moving the receptacle itself from a first position to another, desired position, requires disengaging the edge toothed projection 138 from complementary grooves 135, changing/adjusting the position of arm members 2/3 with respect to the receptacle's projection 133, and re-engaging the edge toothed projections 138 in the complementary grooves 135 at the sides of projection 133.

Bolt 140 is placed through the opposing, co-linear holes 141/142 in arm members 2/3, and through co-linear hole 143 in projection 133 from the receptacle, and held in place with a nut 144 at the other end of the bolt 140. The head 145 of bolt 140, and nut 144 attached to bolt 140, may seat in indents/recesses 146/147 of appropriate size/shape on the outer walls of arm members 2/3.

In some embodiments, the arm member's position may be adjustable, with the receptacle's position fixed. In other embodiments, the arm member's position may be fixed, with the receptacle's position adjustable.

The invention claimed is:

1. An adjustable receptacle for dog and cat foods and beverages comprises
   a base member and configured for positioning on a substantially horizontal surface;
   a connector attached to, and projecting upwardly from, said base member;
   an adjustable, positionable arm member including a proximal end and a distal end, movably connected to said connector at the proximal end of said arm member, and adjustable, positionable, and securable through engagement of toothed projections and complementary grooves, in a plurality of positions with respect to said base member;
   and an adjustable, positionable receptacle for dog and cat foods and beverages connected to the distal end of said arm member, said receptacle being securable in a plurality of positions.

2. An adjustable receptacle for dog and cat foods and beverages comprises
   a base member configured for positioning on a substantially horizontal surface;
   a connector attached to, and projecting upwardly from, said base member;
   an adjustable, positionable arm member including a proximal end and a distal end movably connected to said connector at the proximal end of said arm member, and adjustable, positionable, and securable, through engagement of toothed projections and complementary grooves, in a plurality of positions with respect to said base member;
   and a receptacle for cat and dog foods and beverages connected to the distal end of said arm member.

\* \* \* \* \*